United States Patent [19]

Davies et al.

[11] E Re. 28,813

[45] Reissued May 18, 1976

[54] PACKING MACHINE

[75] Inventors: Robert William Davies; Maxwell Francis Veness; Leonard Thornton, all of London, England

[73] Assignee: Molins Limited, London, England

[22] Filed: July 3, 1974

[21] Appl. No.: 485,671

Related U.S. Patent Documents

Reissue of:

[64] Patent No.: 3,762,130
Issued: Oct. 2, 1973
Appl. No.: 102,013
Filed: Dec. 28, 1970

[30] Foreign Application Priority Data

Jan. 9, 1970 United Kingdom ..... 1193/70

[52] U.S. Cl. ..... 53/53; 53/183; 53/195; 53/207

[51] Int. Cl.[2] ..... B65B 5/02; B65B 19/12; B65B 19/28

[58] Field of Search ..... 53/148–150, 53/183, 191, 194, 195, 234, 236, 53, 207

[56] References Cited

UNITED STATES PATENTS

| | | | |
|---|---|---|---|
| 864,256 | 8/1907 | Pollard et al. | 53/195 |
| 1,870,533 | 8/1932 | Scott et al. | 53/148 X |
| 2,196,666 | 4/1940 | Moore | 53/29 |
| 2,603,047 | 7/1952 | Malhiot | 53/195 |
| 2,603,925 | 7/1952 | Moore | 53/192 X |
| 3,057,126 | 10/1962 | Chalmers et al. | 53/183 X |
| 3,527,014 | 9/1970 | Wahle et al. | 53/234 X |
| 3,543,471 | 12/1970 | Youngman | 53/234 X |
| 3,545,172 | 12/1970 | Osterdahl | 53/236 X |
| 3,553,925 | 1/1971 | Gianese | 53/148 X |
| 3,590,556 | 7/1971 | Focke | 53/192 X |
| 3,608,270 | 9/1971 | Rudszinat et al. | 53/148 X |
| 3,618,291 | 11/1971 | Krebs | 53/207 X |

*Primary Examiner*—Robert L. Spruill
*Attorney, Agent, or Firm*—John C. Smith, Jr.

[57] ABSTRACT

A packing machine for cigarettes comprises a number of rotatable drums which are driven intermittently. Carton blanks and foil-wrapped bundles of cigarettes are fed by separate transfer drums to a common wrapping drum, which has pockets into each of which is inserted first a blank and then a cigarette bundle. Partial folding of the blank occurs while it is on the blank transfer drum, further folding as it is inserted into a pocket of the wrapping drum, and yet further folding after insertion of the cigarette bundle. The blank is partially gummed before it reaches the blank transfer drum and further gumming is effected on a further drum to which the cigarette bundles with their (now folded) blanks are transferred from the wrapping drum.

13 Claims, 10 Drawing Figures

PACKING MACHINE

Matter enclosed in heavy brackets [ ] appears in the original patent but forms no part of this reissue specification; matter printed in italics indicates the additions made by reissue.

The present invention relates to packing machines and more particularly to a machine which is suitable for packing cigarettes.

When packing cigarettes three basic operations are carried out, namely, a bundle of cigarettes is first formed, the bundle is then wrapped in foil, and finally a blank is folded and stuck around the wrapped bundle to form a packet containing the bundle. The present invention is concerned with a machine which will fold the packet blank around the wrapped bundle and stick the blank to form the cigarette packet, the bundle having previously been formed and wrapped on another machine or machines. However, the invention is not limited to machines for the packing of bundles of cigarettes but could be embodied in machines for packing or wrapping other articles.

According to the present invention a packing or wrapping machine has a plurality of rotary members, each member being adapted to carry at least one article to be packed or wrapped and having associated with it functional means for carrying out at least one part of a packing or wrapping operation, means for moving the article to each of the rotary members in turn to effect the whole packing or wrapping operation, and means for driving the rotary members intermittently in order to bring each article carried by each rotary member to successive predetermined positions, at or between which positions said functional means are placed.

By using rotary members as opposed to the reciprocating mechanisms used in previous packing machines, a higher rate of output can be obtained from the machine.

In a preferred embodiment of the invention the machine has a first rotary member adapted to pick up on its periphery articles to be packed or wrapped and to rotate to bring the articles into register with pockets formed in the periphery of a second rotary member; a third rotary member, adjacent the second rotary member, adapted to pick up carton blanks and transfer them to the pockets in the second rotary member so that each pocket in the second rotary member is in turn filled with a carbon blank and an article to be wrapped; and a fourth rotary member positioned adjacent the second rotary member and adapted to receive on its periphery articles from the second rotary member packed or wrapped in the blanks from the third rotary member, the fourth rotary member having means associated with it for gumming portions of the blank.

A fifth rotary member may be positioned adjacent the said fourth rotary member in order to receive the packed or wrapped articles, the fifth rotary member having means associated with it for ejecting unsatisfactorily packed or wrapped articles and for replacing such ejected articles with substitutes.

The aforesaid preferred embodiment of the invention will now be described, by way of example only, in more detail with reference to the accompanying drawings, in which.

Figure 1:
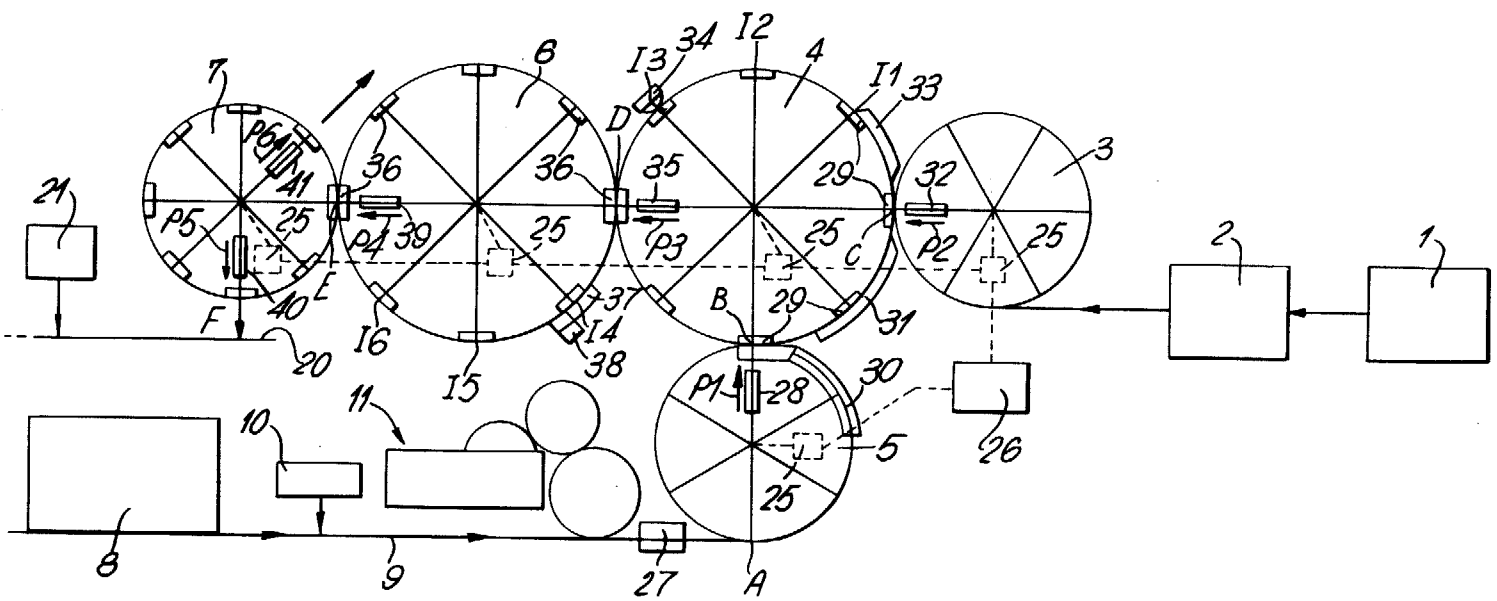
FIG. 1 is a diagrammatic representation of a cigarette-packing machine embodying the invention.

The machine to be described requires a supply of wrapped bundles of cigarettes. As shown diagrammatically in FIG. 1, cigarettes are first formed into a bundle comprising three rows of cigarettes by apparatus 1 which forms no part of the present invention. The bundles of cigarettes are then fed to a second apparatus 2, also forming no part of the invention, which wraps the bundles in metal foil.

The wrapped bundles are then passed to the input of the packing machine embodying the present invention.

This machine comprises basically five rotary members in the form of drums 3 to 7 which in operation are rotated intermittently by indexing mechanisms *25* driven from a common power source *26* [(not shown)].

The first drum 3 is designed to accept the wrapped bundles from the apparatus 2 and transfer them to the second drum 4 to be enclosed in packet blanks fed to the drum 4 by the drum 5.

The drum 5 is in turn supplied with packet blanks from the reservoir 8 by a conveyor 9. A detector 10 for detecting whether a blank is missing or whether two blanks one on top of the other are being fed along the conveyor 9 is provided. Downstream of the detector 10 is positioned a gummer 11 by which portions of the blank having gum applied to them.

Figure 2:
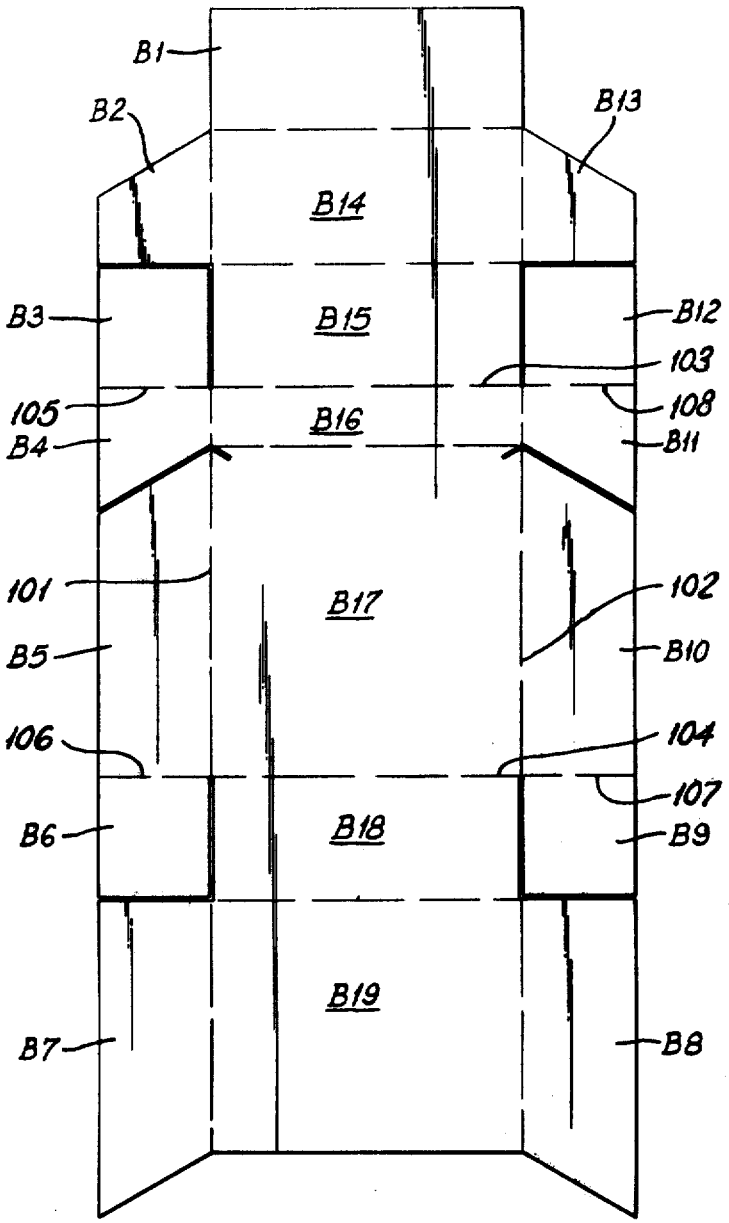
FIG. 2 illustrates a packet blank for use on the machine of FIG. 1, prior to being folded [.]; *and*

The manner in which the apparatus operates will now be described. Reference will be made to [FIG. 2] *FIGS. 2 to 10*, from which it will be seen that the packet blank has a plurality of panels B1–B19 separated by cuts (double solid lines) or scores (single broken lines). *To each of the first sides 101 and 102 of the base panel B16–B17 are attached two first side panels B4, B5 and B10, B11 respectively and to each of the second sides 103 and 104 of the base panel B16–B17 is attached a second side panel B15 and B18 respectively. The side 105, 106, 107, 108 of each first side panel is substantially in alignment with the respective second sides 103 and 104 of the base panel B16–B17 and to each side 105, 106, 107, 108, a tab B3, B6, B9, B12 is attached.*

Figure 3:
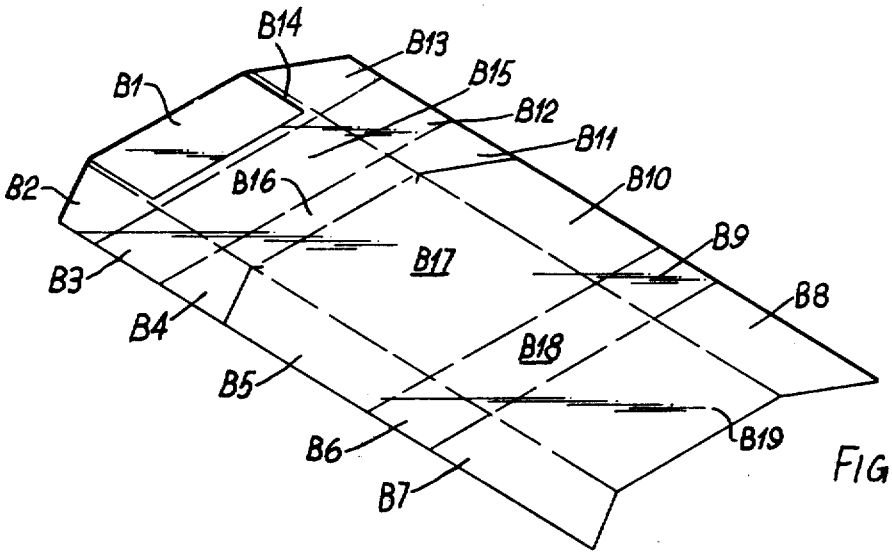
*FIGS. 3 to 10 are perspective views illustrating the progressive steps of folding the carton blank.*

Each blank as it passes along the short conveyor 9 has the panels B14, B15 and B18 gummed by the gummer 11 and the panel B1 folded over by conventional folders *27* [(not shown)] and stuck to the panel B14, *as shown in FIG. 3.*

As the blank reaches the blank transfer drum 5 the latter is stationary and the blank is transferred to the drum at A and after transfer the blank transfer drum 5 is rotated through 60° in an anticlockwise direction. This rotation will bring a previously loaded blank into the position B in register with the periphery of the wrapping drum 4. The packet in the position B will then be transferred *in the direction of arrow P1 by means 28* into a pocket *29* in the periphery of the drum 4 and in being transferred will be partially shaped to accept a wrapped bundle from the bundle drum 3.

Figure 4:
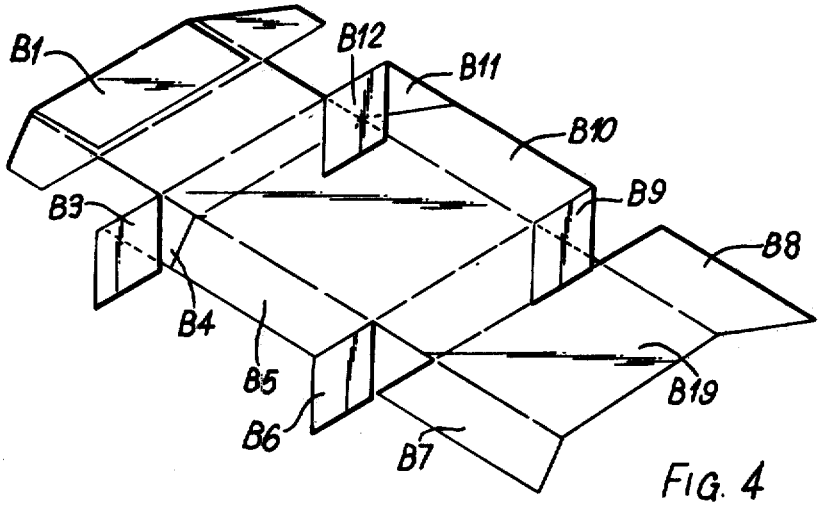

When the drum 5 rotates between the position A and the position B it causes the [panels] *tabs* B3, B6, B9 and B12 to be bent through 90° *as shown in FIG. 4* against conventional stationary folders *30*. [(not shown) ] positioned adjacent the blank transfer drum 5. In moving between the position A and the position B the blank transfer drum 5 is indexed three times, i.e., it takes three steps for a blank to travel from the position A to the position B.

Figure 5:
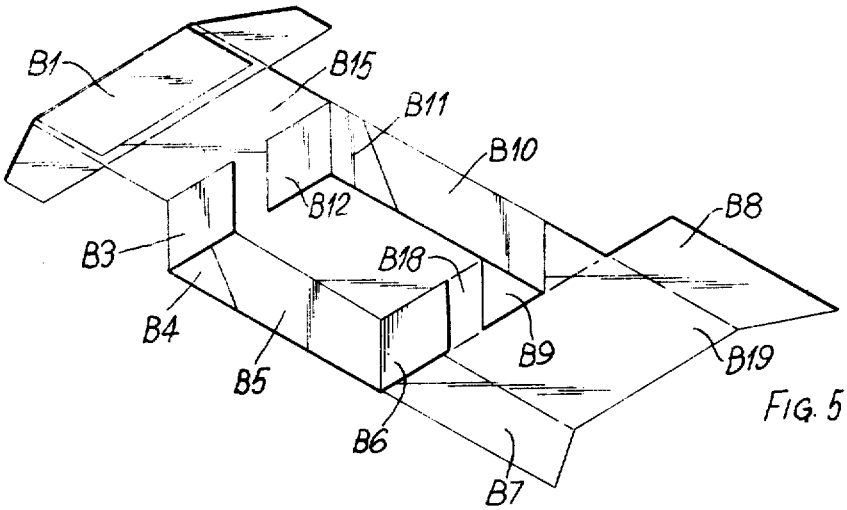

As well as folding the [ panels ] *tabs* B3, B6, B9 and B12 in moving from A to B it could also be arranged to fold the *first side* panels B4, B5, *and* B10 and B11[ .] *to a position such that they are at right angles to the panel B17, as shown in FIG. 5.*

However, in the embodiment illustrated, upon being transferred at the position B from the blank transfer drum 5 to the wrapping drum 4 the *two first side* panels B4, B5, *and* B10 and B11 are folded by the insertion of the blank into the pocket *29* on the drum 4. Furthermore, as this transfer takes place the *two second side* panels B15 and B18 are folded so that the [ panel ] *tab* B3 and the [ panel ] *tab* B12 stick to the [ panel ] *second side* B15, and the [ panels ] *tab* B6 and B9 to the *second side* panel B18. *After being fully inserted into the pocket 29 the blank has attained the partially folded and sealed condition shown in FIG. 6.*

Figure 6:
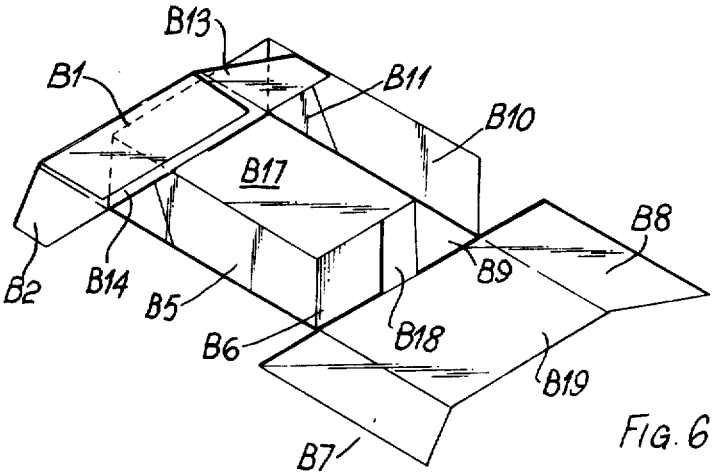
Figure 7:
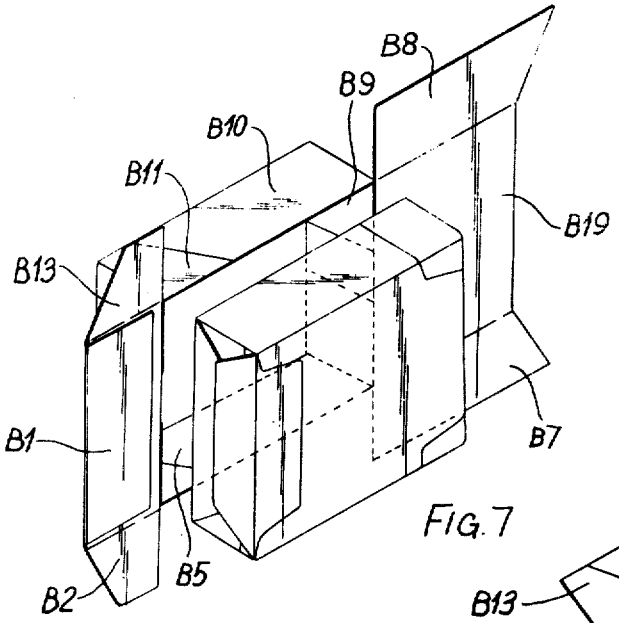

As the wrapping drum 4 is then indexed, rotated through 90° (in two 45° steps) in an anticlockwise direction, to move a given pocket *29* from the position B to the position C adjacent the bundle drum 3, that pocket runs past guides *31* [ (not shown) ] which serve to hold back the panels B14 and B19, *in the positions shown in FIGS. 6 and 7,* in order to keep them out of the way of the opening now formed in the blank, which is now a partially formed packet. When the pocket is at the position C a wrapped bundle is pushed from the bundle drum 3, through said opening into the partially formed packet held in the pocket in the wrapping drum 4 [ . ], *in the direction of arrow P2 by means 32. The relative positions of a partially formed packet and a wrapped bundle at the position C, immediately prior to the bundle being inserted into the partially formed packet, are shown in FIG. 7.*

Figure 8:
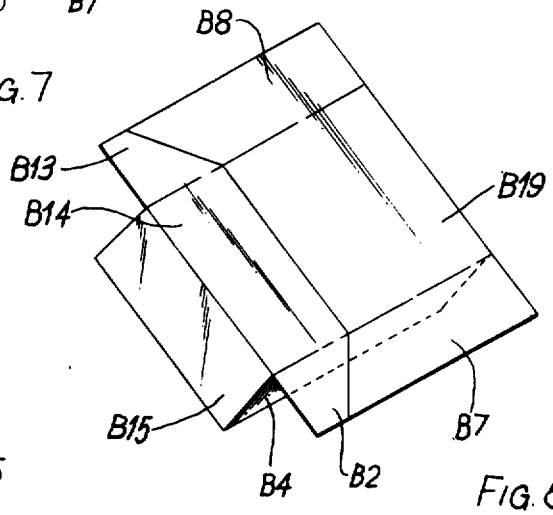
Figure 9:
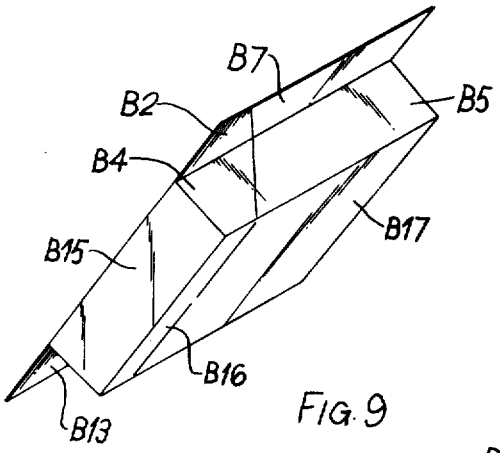
Figure 10:
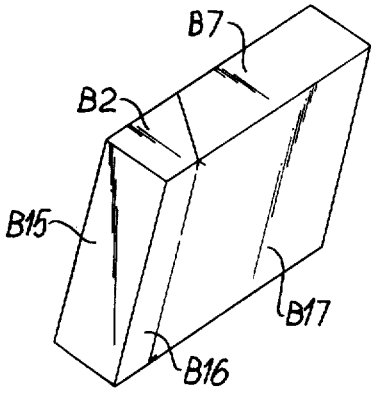

The wrapping drum 4 then continues to be rotated in 45° steps in an anticlockwise direction, so as to pass through three intermediate positions I1, I2, I3 before reaching the position D where the packet and bundle are brought into register with the periphery of the drum 6. In moving between the position C and the position D the panels B1, B14 and B19 are folded down by stationary folders *33, as shown in FIG. 8,* positioned adjacent the drum 4, this folding operation occurring as the packet moves from the position C through 45° to its first intermediate position I1. In moving through the next 45° to the second intermediate position I2 no operation is carried out on the packets but upon reaching the second intermediate position I2 any defective packets can be ejected. Assuming there is no ejection, the packet then moves through a further 45° into the third intermediate position I3 at which the panels B2, B7, B8 and B13 could be gummed *by a gummer 34, the packet at position I3 being as shown in FIG. 9* . The packet then moves through a further 45° into the position D at which a plunger *35* carried by the wrapping drum 4 urges the packet and enclosed bundle radially outwardly, *in the direction of arrow P3,* into a pocket *36* on the periphery of the drum 6. *After being fully inserted into a pocket 36, the packet is as shown in FIG. 10.*

The drum 6 could be designed both to gum portions of the packet and also to dry the gum. The drum 6 could also be employed to effect a wrapping operation on the packet. These operations would be carried out as a given packet is moved from the position D to the position E through three intermediate positions I4, I5 and I6 by clockwise rotation of the drum 6, *the gumming and drying operations being carried out by a gummer 37 and drying means 38, respectively.*

Alternatively, all the gumming operations could be carried out on the blank as it is carried by the conveyor 9.

At the position E the finished packet is ejected, *in the direction of arrow P4 by means 39,* on to the periphery of the drum 7. The drum 7 rotates in an anticlockwise direction in 45° steps and takes any given packet from the position E through 270° to the position F at which the packet is ejected from the drum 7, *in the direction of arrow P5 by means 40,* on to a conveyor 20. However, before reaching the position F the packet can be rejected, *in the direction of arrow P6 by means 41,* after having moved through 45° from the position E, if the packet is defective.

Any rejection at this point or at the position I2 of the wrapping drum 4 will result in gaps in the stream of packets emanating from the drum 7 at the point F. Such gaps will have to be filled and for this purpose an arrangement, indicated by 21, is provided by which packets can be fed into the stream of packets emanating from the drum 7 in order to fill any gaps therein.

The general operation of apparatus constructed according to the present invention has been described without reference to any details concerning the specific construction of the various drums employed. These could take various forms for carrying out the operations described above.

What we claim as our invention and desire to secure by Letters Patent is:

1. A packing machine comprising a. a first rotatably mounted drum having a plurality of pockets in the periphery thereof, each for receiving a carton blank and subsequently an article to be contained therein, b. first functional means arranged to insert carton blanks in succession into each of said pockets, said first functional means including means for partially folding and sealing said carton blank forming the base panel with four adjacent perpendicular side panels, the remaining panels attached to at least one of said side panels being left unfolded and unsealed, c. second functional means arranged to insert at least one article into each of said partially folded cartons in succession while said partially folded cartons are retained in said pockets, d. at least one further rotatably mounted drum having a plurality of pockets therein, e. means for transferring each partially folded carton with the article contained therein between two pockets, each in a different drum, f. third functional means arranged to fold and seal the remaining panels of said carton blank to complete formation of the carton after insertion of the article, and g. means for driving the drums intermittently to bring each partially folded carton to successive predetermined positions.

2. A machine as claimed in claim 1, in which said third functional means comprises stationary folders engageable by said panels of each blank while the driving means is operative.

3. A machine as claimed in claim 2 wherein said one drum carries at least one plunger arranged to serve as the means for transferring blanks with articles from the pockets of one drum to the pockets of another drum, and said third functional means includes fourth functional means associated with said further drum and arranged to apply gum to portions of each blank carried by the further drum and fifth functional means for drying the gum so applied.

4. A machine as claimed in claim 3, including means for applying gum to portions of each carton blank before insertion thereof in one of the pockets of said one drum.

5. A machine as claimed in claim 4, including a blank feed conveyor and a blank transfer drum also associated with the driving means and adapted to transfer the carton blanks one at a time from said blank feed conveyor to the pockets of said one drum.

6. A machine as claimed in claim 5, including means for gumming portions of each blank and means for folding one panel of said blank, both said gumming and said folding means being associated with said blank feed conveyor so as to operate successively on each blank carried thereby.

7. A machine as claimed in claim 6, including further functional means comprising stationary folders associated with said blank transfer drum to fold portions of each blank as said drum carries the blank past said folders.

8. A machine as claimed in claim 7, including an article transfer drum arranged to deliver an article to each pocket of said one drum after that pocket has received a carton blank.

9. A machine as claimed in claim 8, including an additional transfer drum arranged to receive finished packets and transfer said packets to an output conveyor, and means associated with said additional transfer drum for rejecting faulty packets before they reach said output conveyor.

10. A machine as claimed in claim 1 wherein said partially folding and sealing means comprises a. means for folding four side panels joined about four sides of said base panel to positions perpendicular to said base panel, b. means for folding two tabs on opposite ends of each of two of said side panels to positions perpendicular to said two side panels, said two side panels being at opposite sides of said base panel, and c. means for gumming the other two side panels on the other two opposite sides of said base panel and extending between said opposite ends of said first two side panels, d. whereby said tabs are glued to said other two side panels when said first functional means inserts each carton blank in a pocket.

11. A machine as claimed in claim 10 wherein said first functional means includes conveyor means for feeding blanks in succession and a rotatably mounted transfer drum driven by said driving means adapted to transfer the carton blanks one at a time from said conveyor to the pockets of said first drum.

12. A machine as claimed in claim 11 wherein said second functional means includes an article transfer drum driven by said driving means and arranged to deliver an article to each pocket of said first drum after receiving a carton blank.

*13. A machine for folding carton blanks into cartons and packing said cartons wherein each said carton blank comprises a rectangular base panel having two first sides at opposite sides thereof and two second sides at opposite sides thereof and extending between said first sides, at least one first side panel joined to each of said two first sides of said base panel, at least one side of each first side panel being in substantial alignment with one of said two second sides of said base panel, a second side panel joined to each of said second sides of said base panel, and a tab joined to each of said first side panels at said one side thereof, said machine comprising in combination:*

*a. a first rotatable drum having pockets, each adapted to accommodate a partially formed carton and an article within the latter;*

*b. a reservoir for said carton blanks;*

*c. means for feeding said carton blanks successively from said reservoir;*

*d. means for partially folding and sealing portions of each carton blank comprising means for folding said side panels to positions transverse to the plane of said base panel, means for folding said tabs to positions transverse to the respective planes of said first side panels, and means for gumming predetermined portions of said carton blank;*

*e. means for inserting a partially folded carton blank into each of said pockets in said first drum in succession such that said second side panels are joined to said tabs whereby a partially folded and sealed carton is located in each pocket of said first drum;*

*f. a second rotatable drum having pockets adapted to carry a succession of articles for insertion into said partially folded and sealed cartons;*

*g. driving means for rotating said drums intermittently in synchronism whereby pockets of said second drum are in succession brought into register with successive pockets in said first drum;*

*h. means for transferring said articles in succession from pockets of said second drum into said partially folded and sealed cartons contained in said successive pockets of said first drum; and*

*i. means operative thereafter for folding and adhesively securing remaining portions of said blanks thereby to complete the formation of the cartons.*

* * * * *